(12) United States Patent
Laureanti

(10) Patent No.: US 6,188,917 B1
(45) Date of Patent: Feb. 13, 2001

(54) PORTABLE TELECOMMUNICATIONS ASSEMBLY HAVING USER HAND-HOLD, AND ASSOCIATED METHOD

(75) Inventor: Steven J. Laureanti, Lewisville, TX (US)

(73) Assignee: Nokia Mobile Phones Limited, Espoo (FI)

( * ) Notice: Under 35 U.S.C. 154(b), the term of this patent shall be extended for 0 days.

(21) Appl. No.: 09/153,999

(22) Filed: Sep. 16, 1998

(51) Int. Cl.[7] .................................................. H01M 10/44
(52) U.S. Cl. ........................ 455/573; 455/550; 455/557; 455/556; 379/38; 379/93
(58) Field of Search ................. 455/89, 90, 426, 455/575, 550, 556, 557, 348, 349, 351, 572, 573, 404, 464, 558, 566; 379/38, 93, 435, 436, 455, 96, 110, 919, 420, 440, 428; 345/173, 179, 901, 903; 395/281, 893, 733, 800, 200.41; 364/708.1; 340/825.44

(56) References Cited

U.S. PATENT DOCUMENTS

| 5,535,434 | * | 7/1996 | Siddoway et al. | 455/89 |
| 5,625,673 | * | 4/1997 | Grewe et al. | 379/61 |
| 5,628,055 | * | 5/1997 | Stein | 455/89 |
| 5,659,887 | * | 8/1997 | Ooe | 455/575 |
| 5,873,045 | * | 2/1999 | Lee et al. | 455/550 |
| 5,941,648 | * | 8/1999 | Robinson et al. | 400/82 |
| 5,974,334 | * | 10/1999 | Jones, Jr. | 455/573 |
| 5,983,073 | * | 11/1999 | Ditzik | 455/11.1 |
| 6,041,243 | * | 3/2000 | Davidson et al. | 455/575 |
| 6,073,136 | * | 6/2000 | Bertram et al. | 707/104 |

* cited by examiner

Primary Examiner—Thanh Cong Le
Assistant Examiner—Pablo Tran
(74) Attorney, Agent, or Firm—Thomas B. Hayes

(57) ABSTRACT

A communication device combined with a portable radio telephone operates upon communication media and transceives signals representative of the communication media between the communication device and a remote station. The communication device includes a docking port into which a proximal end-side portion of the portable radio telephone is insertable to be positioned at a docking position. Once positioned at the docking position, the portable radio telephone is used as a hand-hold to support the communication device engaged together with the radio telephone.

20 Claims, 4 Drawing Sheets

112

```
┌─────────────────────────────┐
│   INSERT PROXIMAL END       │
│   SIDE OF RADIOTELEPHONE    │
│   INTO DOCKING PORT         │──114
│   OF COMMUNICATION DEVICE   │
└─────────────────────────────┘
              │
              ▼
┌─────────────────────────────────┐
│    HOLD DISTAL END SIDE         │
│ OF RADIOTELEPHONE TO SUPPORT    │
│    BOTH RADIOTELEPHONE          │──116
│   AND COMMUNICATION DEVICE      │
└─────────────────────────────────┘
```

*FIG. 8*

PORTABLE TELECOMMUNICATIONS ASSEMBLY HAVING USER HAND-HOLD, AND ASSOCIATED METHOD

The present invention relates generally to the communication of communication media by way of a radio link, such as the radio link formed between a radio telephone and network infrastructure of a cellular, or other, radio communication system. More particularly, the present invention relates to a telecommunications assembly, a communication device, and an associated method, by which to communicate communication media with a remote location by way of a radio link. A user is able, with one hand, both to support the telecommunications assembly and to effectuate its operation.

BACKGROUND OF THE INVENTION

A communication system is operable to communicate information between a transmitting station and a receiving station by way of a communication channel. A radio communication system is a communication system in which the communication channel by which information is communicated between the transmitting and receiving stations is formed upon a portion of the electromagnetic spectrum.

A cellular communication system is exemplary of a multi-user, radio communication system. A cellular communication system is a multi-user system, permitting large numbers of users to communicate telephonically therethrough. With the installation of the network infrastructure of cellular communication systems throughout large geographical areas, together with the affordability of telephonic communication effectuated therethrough, use of cellular communication systems by which to communicate telephonically has achieved wide popularity.

Advancements in digital communication techniques have been utilized to form digital cellular communication systems, the network infrastructure of which also has been installed throughout wide geographical regions. Digital modulation techniques permit efficient utilization of the available electromagnetic spectrum allocated to cellular communication systems. Also, digital modulation techniques facilitate the transmission of digital data which can more directly be modulated, in contrast to conventional analog signals.

Digital data, such as computer data or, more generally, "communication media", can be transmitted by way of a cellular, or other, radio communication system, thereby to effectuate the transfer of data between remotely-positioned locations.

Digital data generated by any of many various types of communication devices can be provided to radio telephonic apparatus, such as a portable radio telephone, to be modulated thereat and transmitted by way of a radio link to the network infrastructure of the cellular communication system, thereafter to be routed to a receiving station. Analogously, digital data generated at such location can be provided to the network infrastructure of the cellular communication system, transmitted upon a radio link established with the radio telephone, and thereafter provided to the communication device, when coupled to the radio telephone. Some of such communication devices are conventionally coupled to a portable radio telephone by way of, e.g., a cable connector of infrared coupler. When the communication device is formed of a personal computer, for instance, a cable connector is sometimes utilized to connect a data port of the personal computer to a corresponding data port of the radio telephone.

The conventional manner by which to couple a communication device together with a portable radio telephone to permit the communication of communication media between the communication device and a remote location is somewhat unwieldy, requiring, for instance, a support surface, such as a tabletop, upon which to support the separate devices.

As the electronic circuitry forming portions of electrical devices, such as communication devices and portable radio telephones, becomes increasingly miniaturized, the housings in which such electronic circuitry is housed can be reduced in size, thereby to form devices of increasingly-smaller packages.

The smaller-sized communication devices, in some instances, are of dimensions permitting a user thereof easily to carry such devices. And, a conventional, portable radio telephone is of physical dimensions permitting a user also easily to carry a portable radio telephone. However, when the communication device is connected to a portable radio telephone in conventional manner, the user of the communication device is compelled to hold the radio telephone with one hand and the communication device with another. Or, one or both, of the devices must be separately supported, such as on a support surface. Thereby, the advantages of the increased miniaturization of such devices are largely obviated because of the cumbersome manner by which such devices must be held.

A manner by which a user of a communication device coupled to a portable radio telephone could more easily support the communication device together with the radio telephone would advantageously facilitate ease of use of the communication device.

It is in light of this background information related to the communication of communication media that the significant improvements of the present invention have evolved.

SUMMARY OF THE INVENTION

The present invention, accordingly, advantageously provides a communication device, and associated method, and a telecommunications assembly including the communication device by which to communicate the communication media with a remote location by way of a radio link.

In one aspect of the present invention, a communication device includes a docking port. A portable radio telephone is insertable into the docking port to be positioned at a docking position. When positioned at the docking position, operations performed upon communication media at the communication device can be provided to the radio telephone for transmission over a radio link to a remote station. And, communication media provided to the radio telephone by way of the radio link can be provided to the communication device.

The portable radio telephone further functions as a handhold permitting the user, single handedly, to support both the radio telephone and the communication device. And, through appropriate positioning of actuation keys on a face surface of the communication device, the user also is able to actuate the actuation keys with the same hand by which the portable radio telephone is held.

Convenience of use of the communication device is thereby facilitated. The user need not hold the communication device with one hand and the portable radio telephone with another hand, or support at least one of the communication device and radio telephone at a separate support surface. When engaged theretogether, the user is able to orient the communication device at almost any selected orientation relative to the user, thereby to permit optimization of the user's viewing angle of a user display, when forming a portion of the communication device.

In another aspect of the present invention, a telecommunications assembly is provided which permits communication media to be communicated by way of a radio link to a remote station. In one implementation, the telecommunications assembly includes a portable radio telephone operable in a communication system, and the radio link upon which the communication media is communicated comprises a radio channel defined in the cellular communication system in which the cellular radio telephone is operable.

The portable radio telephone is engaged with the communication device at a docking port which is formed to extend into the communication device from a housing surface portion of the device. When the portable radio telephone is inserted into the inwardly-extending docking port to be positioned at a docking position, the radio telephone is releasably latched into position thereat by a latching mechanism. A data port of the portable radio telephone becomes electrically connected to a corresponding data port positioned at the docking port of the communication device when the radio telephone is positioned at the docking position. Electrical circuitry of the communication device operates upon communication media, including communication media supplied to the communication device by way of the radio telephone, and also to provide communication media formed at the communication device to the radio telephone. The data provided to the radio telephone is modulated and transmitted by way of a radio link to the network infrastructure of a cellular communication system and thereafter routed to a remote station. And, communication media provided to the communication device by the radio telephone is generated, for example, by the remote station, routed to the network infrastructure of the cellular communication system, and transmitted by way of a radio link to the radio telephone.

When the radio telephone is positioned at the docking position, a user of the communication device is able to grasp the portion of the radio telephone which protrudes beyond the inwardly-extending docking port such that the extended portion of the radio telephone forms a hand-hold by which the user is able to support the communication device with which the radio telephone is engaged. Also, when the communication device includes actuation keys formed thereon, the user is able to actuate the actuation keys with the same hand with which the user grasps the radio telephone.

In one implementation, the actuation keys are utilized, not only to effectuate operation of the communication device to operate upon communication media, but also to effectuate operation of the radio telephone.

Through operation of an embodiment of the present invention, therefore, a manner is provided by which to permit a user of a wireless communication device, such as a PDA (personal digital assistant) or other device which operates upon communication media together to hold the communication device engaged with a portable radio telephone. Wireless communication of communication to and from the communication device is effectuated through the portable radio telephone.

Because the portable radio telephone is used as a hand-hold, when engaged with the communication device, the portable radio telephone and communication device can together be supported and operated, singlehandedly by a user. The cumbersome need, otherwise conventionally required of a user separately to hold, or otherwise support, the radio telephone and the communication device is obviated.

In these and other aspects, therefore, a portable telecommunications assembly, hand-supportable by a user thereof and operable to communicate communication media with a remote station is provided. The telecommunications assembly includes a communication device which has communication-device circuitry for operating upon the communication media and a supportive housing for supportively housing the communication-device circuitry thereat. The supportive housing includes an inwardly-extending port formed to extend inwardly from a face surface of the supportive housing. A portable radio telephone is insertable into the inwardly-extending port of the supportive housing of the communication device to be docked in a docking position thereat. The portable radio telephone has radio telephonic circuitry for transceiving radio frequency communication signals representative of the communication media and a radio telephone housing for supportively housing the radio telephonic circuitry therein. The radio telephonic housing has a proximal end-side portion insertable into the inwardly-extending port and a distal end-side portion extending beyond the supportive housing of the communication device. The distal end-side portion of the radio telephonic housing forms a user hand-hold permitting the user to hand support the portable radio telephone together with the communication device.

A more complete appreciation of the present invention and the scope thereof can be obtained from the accompanying drawings which are briefly summarized below, the following detailed description of the presentlypreferred embodiments of the present invention, and the appended claims.

BRIEF DESCRIPTION OF THE DRAWINGS

FIG. 8 illustrates a method flow diagram listing the method steps of the method of operation of an embodiment of the present invention.

DETAILED DESCRIPTION

Figure 1:
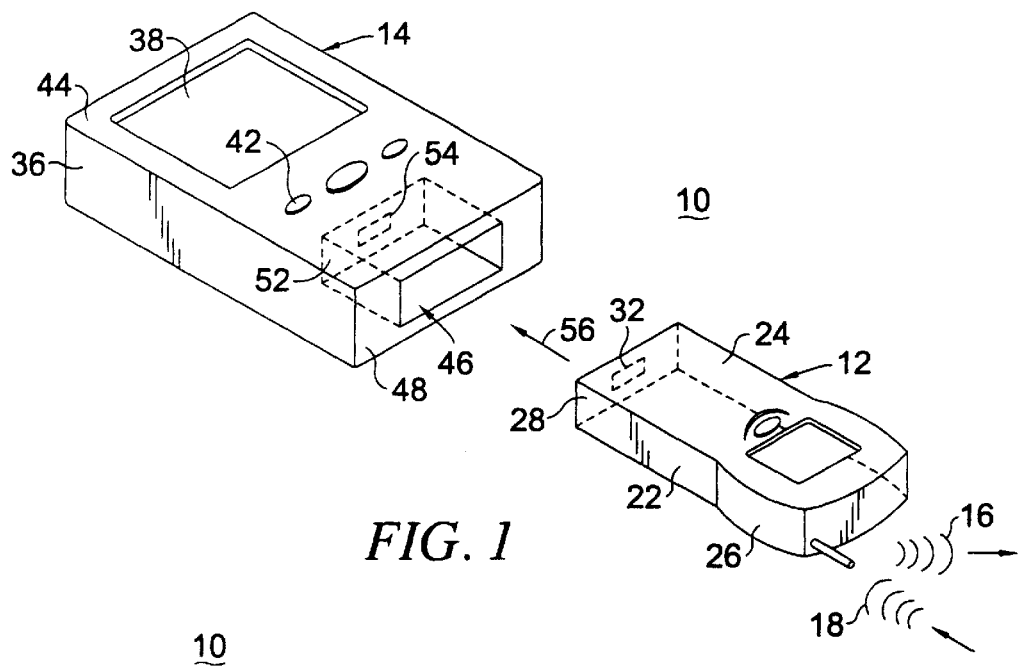
FIG. 1 illustrates a partial perspective, partial functional block diagram of the telecommunications assembly of an embodiment of the present invention in exploded form.

Referring first to FIG. 1, a telecommunications assembly, shown generally at 10, is operable to operate upon communication media and to transceive radio frequency, communication signals representative of communication media with a remote station (not shown in the Figure).

The assembly 10 includes a portable radio telephone 12 and a communications device 14. In the exemplary implementation, the radio telephone 12 is operable in a cellular communication system to transceive communication signals with the network infrastructure (not shown) of a cellular communication system. Uplink signals 16, generated at the radio telephone 12 are transmitted upon an uplink channel to the network infrastructure, and downlink signals 18, formed at the network infrastructure, are received at the radio telephone 12. In conventional fashion, the network infrastructure of a cellular communication system is coupled to a PSTN (public-switched telephonic network) to permit routing of uplink signals received at the network infrastructure to be routed to a remote station coupled to the PSTN and also to route signals generated at the remote station to the network infrastructure at which the downlink signals 18 are generated.

The portable radio telephone 12 includes transceiver circuitry housed within a radio telephonic housing 22. Here, the housing 22 is shown to be of an elongated structure having a proximal side portion 24 and a distal side portion 26. The housing 22 includes an end side face 28 at which a data port 32 is positioned. The data port includes, inter alia, electrical contacts which are coupled to the transceiver circuitry housed within the housing 22.

The communication device 14 includes communication-device circuitry housed within a communication-device housing 36. A user interface which forms a portion of the communication-device circuitry, and here shown to include a user display element 38 and actuation keys 42 are positioned at a face surface 44 of the communication-device housing 36.

An inwardly-extending docking port 46 is formed at an edge-side face surface 48 of the housing 36. The docking port 46 includes a back-side, edge surface 52 at which a data port 54 is positioned. The data port 54 is coupled to the communication-device circuitry of the communication device. The docking port 46 is of dimensions permitting the insertion of the proximal side portion 24 of the housing of the radio telephone 12 therein. The side portion 24 of the radio telephone 12 is inserted into the docking port 46 by causing relative translation of the radio telephone in the direction indicated by the arrow 56. When the radio telephone becomes positioned at the docking position, the data port 32 of the radio telephone engages with the data port 54 of the communication device 14 to be in electrical contact therewith.

Figure 2:
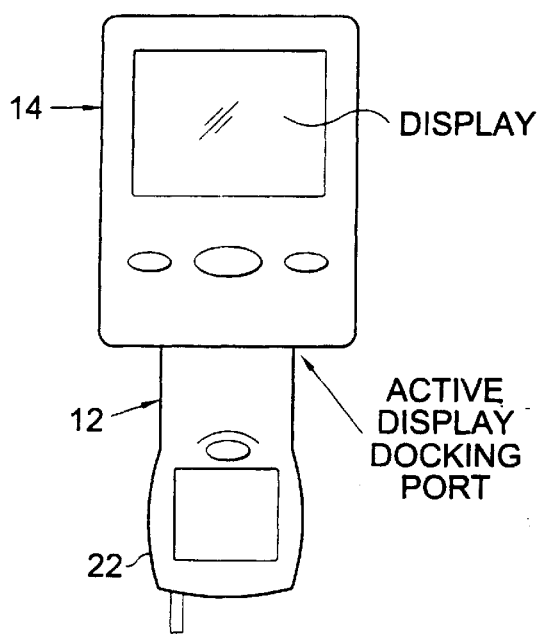
FIG. 2 illustrates the telecommunications assembly shown in FIG. 1 subsequent to engagement of the component portions of the assembly theretogether.

FIG. 2 again illustrates the telecommunications assembly 10 in the illustration shown in the Figure, the portable radio telephone 12 is positioned at the docking position wherein the proximal side portion of the housing 22 of the radio telephone is inserted into the docking port to be engaged thereat. The communication device circuitry of the communication device 14 is coupled to the transceiver circuitry of the radio telephone 12 by way of the connection between the data ports 32 and 54 (shown in FIG. 1) of the radio telephone and communication device, respectively. Communication media operated upon by the circuitry of the communication device is provided to the radio telephone to be transmitted therefrom and signals representative of communication media received by the radio telephone are operated upon by the transceiver circuitry of the radio telephone. Communication media recovered therefrom is provided to the communication device 14 by way of the data ports.

The user display element 38 and the actuation keys 42 forming a user interface of the communication device 14 are also illustrated in the Figure. The actuation keys 42 are formed upon the face surface 44 at the portion of the face surface 44 proximate to the face surface 48 at which the docking port 46 is formed. And, the user display element 38 is positioned at a portion of the face surface 44 positioned away from the edge-face surface 48 at which the docking port is formed.

Figure 3:
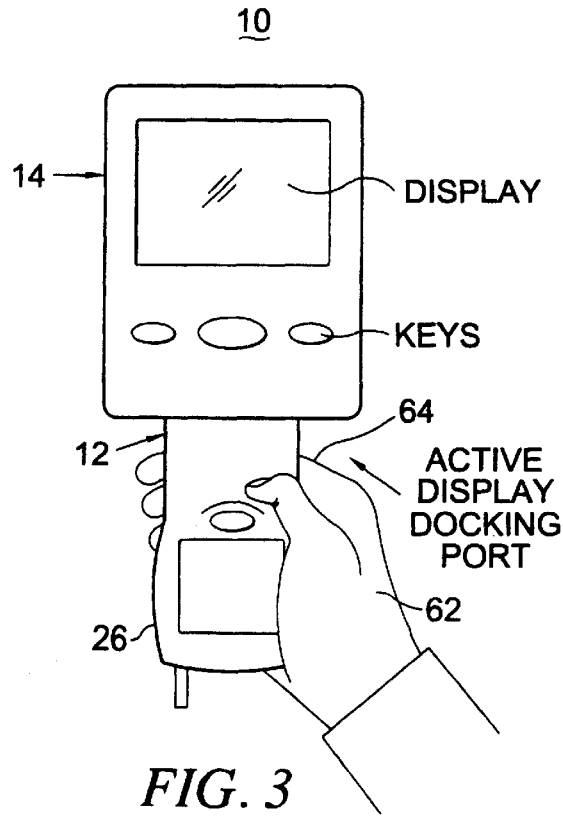
FIG. 3 illustrates a manner by which a user of the telecommunications assembly, shown in FIGS. 1–2, grasps a hand-hold formed of a component portion of the assembly.

FIG. 3 again illustrates the telecommunications assembly 10 of an embodiment of the present invention. Similar to the arrangement shown in FIG. 2, the radio telephone 12 is again positioned at a docking position to be engaged with the communication device 14. Here, the assembly 10 is shown to be hand-supportable by a user of the assembly. Here, a user's hand 62 is shown to grasp the distal side portion 26 of the radio telephone 12, thereby to hand-support the entire assembly 10. While the user is able to grasp the distal side portion 26 of the radio telephone 12 in a manner to orient the assembly 10 relative to the user in any desired orientation, as shown, the user here grasps the distal side portion 26 in a manner to permit the user to view the user display element 38 positioned at the face surface 44.

Also, the user's hand 62 grasps the distal side portion 26 of the radio telephone in manner to permit the user also to actuate the actuation keys 42 of the communication device using the same hand with which the user supports the assembly 10. Here, for instance, the user is able to actuate any of the actuation keys 42 with the user's thumb 64 while still also grasping the distal side portion 26 of the radio telephone. Thereby, the user is able both to support the telecommunications assembly and also effectuate its operation through actuation keys 42. In one embodiment, the actuation keys 42 both control operation of the communication device 14 and also operation of the radio telephone 12 when the radio telephone is positioned at the docking position.

Figure 4:
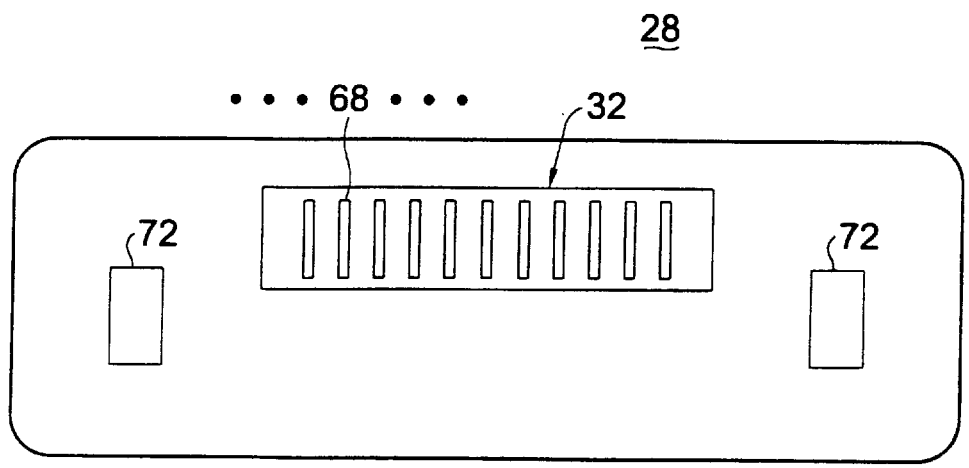
FIG. 4 illustrates a plan view of an end side face surface of the radio telephone forming a portion of the telecommunications assembly shown in FIGS. 1–3 of an embodiment of the present invention.

FIG. 4 illustrates, in isolation, the end side face 28 of the radio telephone 12 which, together with the proximal side portion 24 (shown in FIG. 1) of the radio telephone is inserted into the docking port 46 (also shown in FIG. 1) when the radio telephone is positioned at the docking position. The data port 32 positioned at the edge-side face 28 is shown to be formed of a plurality of vertically-extending electrical contacts 68. A pair of guide holes 72 are positioned symmetrically beyond opposing ends of the data port 32. Other elements sometimes formed upon the end side face 28, such as a power port, are not shown for purposes of simplicity.

Figure 5:
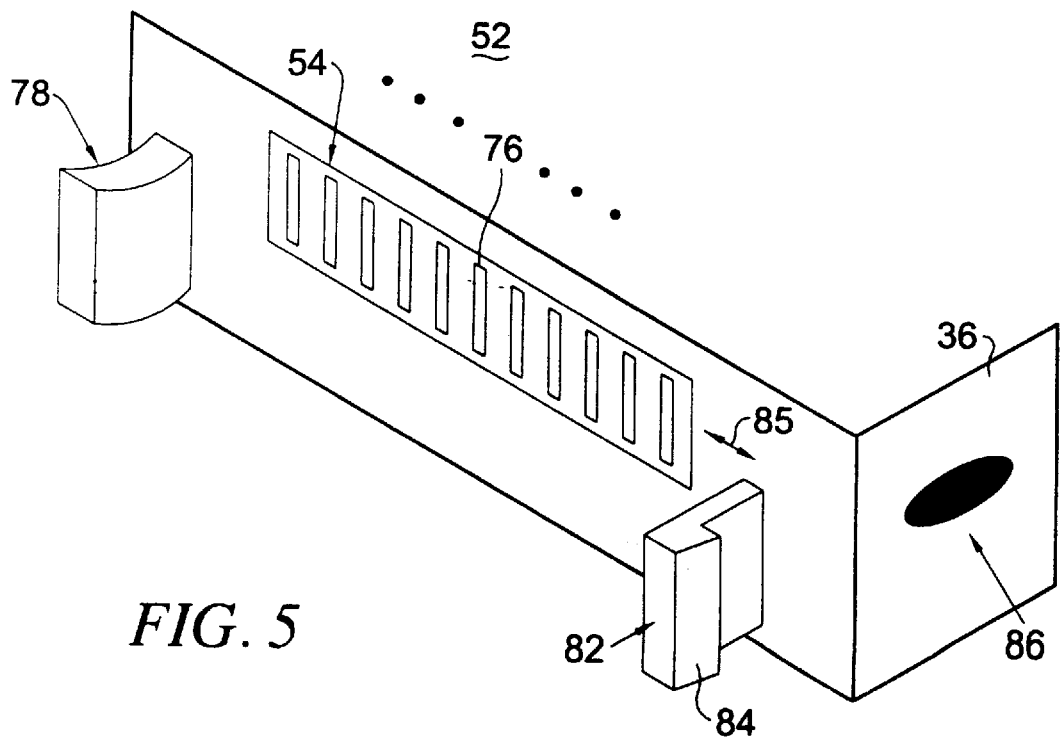
FIG. 5 illustrates a plan view of an inner face surface of a docking port forming a portion of the telecommunications assembly shown in FIGS. 1–3 of an embodiment of the present invention.

FIG. 5 illustrates a portion of the back-side edge surface 52 of the docking port 46 of the communication device 14. The data port 54 is here shown also to include a plurality of vertically-extending electrical contacts, here contacts 76. The contacts 76 are spring-loaded to protrude beyond the edge surface 52 and correspond in number and spacing with the electrical contacts 68 (shown in FIG. 4) of the data port 32 (also shown in FIG. 4). The spring-loading of the contacts 76 facilitates connection between the respective contacts 68 and 76 when the radio telephone 12 is positioned at the docking position. A pair of guide-posts 78 and 82 are also shown in the Figure. The guide-posts 78 and 82 are symmetrically arranged beyond opposing ends of the data port 54 such that, when the radio telephone 12 is inserted into the docking port 46, the guide-posts extend into the corresponding guide holes 72 of the radio telephone. The left-most (as shown) guide-post 78 is curved to be slightly arcuate along its length. And, the right-most (as shown) guide-post 82 includes a hooked-end portion 84. The guide-post 82 is spring-loaded and is permitting of back-and-forth movement in the direction indicated by the arrows 85 between a locking position and an unlocked position. The guide-post 82 thereby functions as a locking mechanism by which to lock the radio telephone 12 in position at the docking position. That is to say, at least one of the guide holes 72 includes an inner ledge surface (not shown) against which a corresponding seating surface of the hooked-end portion 84 of the guide-post 82 is positionable when the radio telephone is positioned at the docking position. A spring lever actuator, shown functionally at 86, is positioned at a housing surface portion of the communication device housing 36. Actuation of the actuator positions the guide-post 82 in a release position to permit the radio telephone to be released out of engagement with the communication device, when desired.

Figure 6:
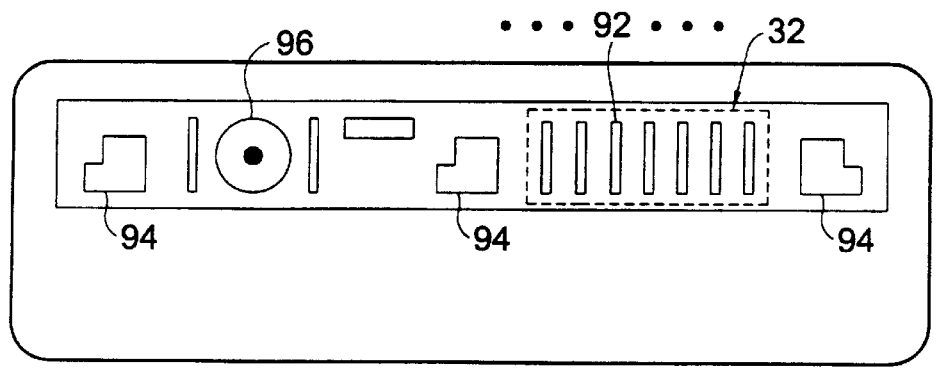
FIG. 6 illustrates a plan view, similar to that shown in FIG. 4, but of an alternate embodiment of the present invention.

FIG. 6 illustrates the end side face 28 of the radio telephone 12 of another embodiment of the present invention. The data port 32 includes a plurality of vertically-extending contacts 92, analogous to the contacts 62 of the embodiment shown in FIG. 4. A series of guide holes 94 are formed to extend into the end side face 28. And, a power port 96 at which the radio telephone can be coupled to a power cable is also positioned at the inside face of the radio telephone.

Figure 7:
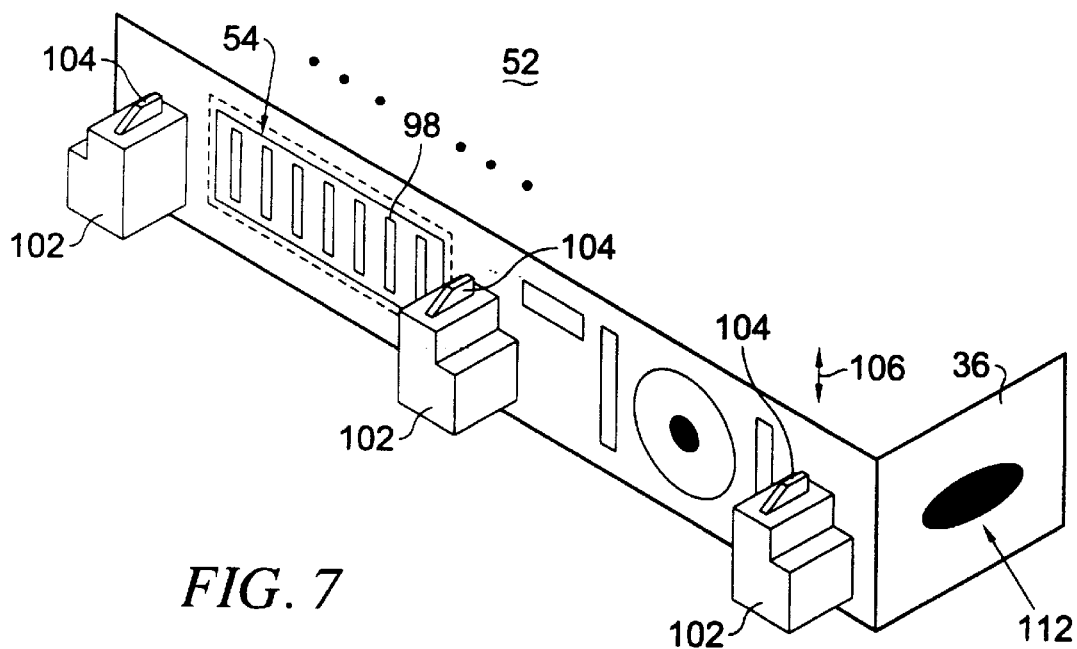
FIG. 7 illustrates a plan view, similar to that shown in FIG. 5, but of an inner face surface of the docking port of another embodiment of the present invention.

FIG. 7 illustrates the back-side edge surface 52 of the docking port 46. The back-side edge surface 52 shown in FIG. 7 is operable to facilitate contact of the data port 32 of the radio telephone 12 with the data port 54 positioned at the back-side edge surface 52. Here again, the data port 54 includes a plurality of vertically-extending contacts, here contacts 98, which are spring-loaded to facilitate their abutment against the corresponding contacts 92 of the data port 32 when the radio telephone is positioned at the docking position. A series of guide-posts 102 of configurations matching the configurations of the guide holes 94 formed in the side face 28 of the radio telephone. The guide-posts 102 function to guide and support in position the radio telephone at the docking position.

The hook members 102 each include upwardly-projecting hook members 104 extending beyond their top face surfaces. The hook members 104 are spring-loaded into their illustrated positions, but are translatable in directions indicated by the arrows 106 responsive to actuation of a locking actuator. The hook members 104 include back-edge surfaces 108 which, when in the locked position, as illustrated, engage with corresponding surfaces of the radio telephone to lock the radio telephone in position at the docking position. When a spring-release actuation key, here represented functionally by the key 112, the radio telephone is permitted to be released out of its engagement with the communication device 14.

FIG. 8 illustrates a method, shown generally at 112, of an embodiment of the present invention. The method permits a user to operatively support a portable telecommunications assembly. First, and as indicated by the block 114, a proximal end-side portion of a portable radio telephone is inserted into an inwardly-extending port formed to extend within a supportive housing of a communication device to be positioned at a docking position to be affixed thereat. Then, and as indicated by the block 116, the user holds the distal end-side portion of the portable radio telephone, thereby to support the portable radio telephone together with the communication device affixed therewith. Thereby, a manner is provided by which a user of a communication device which operates upon communication media together to hold the communication device engaged together with a portable radio telephone. The portable radio telephone is used as a hand-hold to permit the user single-handedly, to support and operate the communication device and the radio telephone.

The previous descriptions are of preferred examples for implementing the invention, and the scope of the invention should not necessarily be limited by this description. The scope of the present invention is defined by the following claims.

What is claimed is:

1. A portable telecommunications assembly hand-supportable by a user thereof and operable to communicate communication media with a remote station, said portable telecommunications assembly comprising:

a communication device having communication-device circuitry for operating upon the communication media and a supportive housing for supportively housing the communication-device circuitry thereat, the supportive housing having an inwardly-extending port formed to extend inwardly from an edge-side face surface of the supportive housing; and a portable radio telephone insertable into the inwardly-extending port of the supportive housing of said communication device to be docked in a docking position thereat, said portable radio telephone having radio telephonic circuitry for transceiving radio frequency communication signals representative of the communication media and a radio telephone housing for supportively housing the radio telephonic circuitry therein, the radio telephonic housing having a proximal end-side portion insertable into the inwardly-extending port and a distal end-side portion extending beyond the supportive housing of said communication device, the distal end-side portion of the radio telephonic housing forming a user hand-hold permitting the user to hand support, said portable radio telephone together with said communication device, said portable radio telephone and said communication device together positionable by the user to be hand-supported at any desired orientation by the user, thereafter to permit the user to effectuate operation of the communication device while the communication device and the radio telephone are positioned in the desired orientation.

2. The portable telecommunications assembly of claim 1 wherein the communication-device circuitry of said communication device further includes electrical, communication device contacts positioned at the inwardly-extending port and wherein the radio telephonic circuitry of said portable radio telephone further includes electrical radio telephonic contacts positioned at the proximal end-side portion of the radio telephonic housing such that, when said portable radio telephone is positioned at the docking position, the communication device contacts abut with the radio telephonic contacts, thereby to form an electrical connection therebetween.

3. The portable telecommunications assembly of claim 2 wherein the radio telephonic contacts comprise a radio telephonic data port and wherein the communication device contacts comprise a communication device data port, data representative of the communication media transportable between said communication device and said portable radio telephone therethrough when said portable radio telephone is positioned at the docking position.

4. The portable telecommunications assembly of claim 2 wherein the communication device circuitry comprises a control circuit for controlling operation of said portable radio telephone when said portable radio telephone is positioned at the docking position.

5. The portable telecommunications assembly of claim 4 the communication device circuitry of said communication device further comprises an actuation keypad, the actuation keypad having actuation keys permitting actuation thereof by the user when supporting said portable radio telephone together with said communication device.

6. The portable telecommunications assembly of claim 5 wherein user control of operation of said communication device is effectuated through selective actuation of the actuation keys of the actuation keypad.

7. The portable telecommunications assembly of claim 5 wherein user control of operation of said portable radio telephone is effectuated through selective actuation of the actuation keys of the actuation keypad.

8. The portable telecommunications assembly of claim 5 wherein the actuation keys are single-handedly actuable by the user while hand-supporting said portable radio telephone together with said communication device.

9. The portable telecommunications assembly of claim 5 wherein said communications device further comprises a user display positioned upon a face surface of the supportive housing of said communications device, the user display for displaying information generated during operation of said communications device, orientation of the user display relative to the user dependent selectable by the hand-support at which the user holds the hand-hold formed of the distal end-side portion of the radio telephonic housing of said portable radio telephone.

10. The portable telecommunications assembly of claim 1 wherein said communications device further comprises a locking mechanism, said locking mechanism for releasably affixing said portable radio telephone in position at the docking position.

11. The portable telecommunications assembly of claim 10 wherein said portable radio telephone includes a detent formed along an edge-side surface thereof and wherein said locking mechanism comprises a locking arm engageable with the detent when said portable radio telephone is positioned at the docking position.

12. The portable telecommunications assembly of claim 10 wherein said locking member comprises a prong member insertable into a bottom edge surface of the radio telephonic housing of said portable radio telephone.

13. In a radio communication system in which a portable radio telephone is operable to transceive radio communication signals with network infrastructure, a combination with the portable radio telephone of a communication device for communicating communication media with a remote station coupled to the network infrastructure, said communication device comprising:

communication device circuitry for operating upon the communication media;

a supportive housing positioned about said communication device circuitry, said supportive housing for supporting said communication device circuitry thereat; and an inwardly-extending port formed at an edge-side surface of said supportive housing to extend inwardly within said supportive housing, said inwardly-extending port for receiving a proximal end-side portion of the portable radio telephone therein at a docking position, such that, when positioned thereat, a distal end-side portion of the radio telephone forms a user hand-hold permitting a user to hand-support, maneuver and effectuate operation of the radio telephone together with said communication device, said portable radio telephone and said communication device together positionable by the user to be hand-supported at any desired orientation by the user, thereafter to permit the user to effectuate operation of the communication device while the communication device and the radio telephone are positioned in the desired orientation.

14. The communication device of claim 13 further comprising a latching mechanism for latching the portable radio telephone in position at the docking position.

15. The communication device of claim 13 wherein the portable radio telephone comprises radio telephonic contacts positioned at the proximal end-side portion thereof and wherein said communication device circuitry comprises communication device contacts, the communication device contacts positioned at said inwardly-extending port such that, when the portable radio telephone is positioned at the docking position, the communication device contacts abut with the radio telephonic contacts, thereby to form an electrical contact therebetween.

16. The communication device of claim 13 wherein said communication device circuitry further comprises an actuation keypad, the actuation keypad having actuation keys permitting actuation thereof by the user when supporting the radio telephone engaged with said inwardly-extending port a the docking position.

17. The communication device of claim 16 wherein use control of operation of said communication device circuitry is effectuated through selective actuation of the actuation keys of the actuation keypad.

18. The communication device of claim 16 wherein user control of operation of the portable radio telephone, when engaged with said inwardly-extending port to be positioned at the docking position, is effectuated through selective actuation of the actuation keys of the actuation keypad.

19. The communication device of claim 16 wherein the actuation keys are single-handedly actuable by the user while hand-supporting said radio telephone together with said communication device.

20. In a method for communicating communication media with a remote station, an improvement of a method for a user to operatively support a portable telecommunications assembly, said method comprising:

inserting a proximal end-side portion of a portable radio telephone into an inwardly-extending port formed to extend within a edge-side face surface of a supportive housing of a communication device to be positioned at a docking position to be affixed thereat; and holding a distal end-side portion of the portable radio telephone, thereby to support, maneuver and effectuate operation of the portable radio telephone together with the communication device affixed therewith, said portable radio telephone and said communication device together positionable by the user to be hand-supported at any desired orientation by the user, thereafter to permit the user to effectuate operation of the communication device while the communication device and the radio telephone are positioned in the desired orientation.

* * * * *